(12) United States Patent
Niwa et al.

(10) Patent No.: US 6,963,457 B1
(45) Date of Patent: Nov. 8, 2005

(54) COLOR WHEEL OF SEGMENT TYPE

(75) Inventors: Shinichi Niwa, Iwata-gun (JP);
Toshiaki Asakawa, Iwata-gun (JP);
Shigeyuki Adachi, Iwata-gun (JP);
Kuniyuki Takao, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 11/002,790

(22) Filed: Dec. 3, 2004

(30) Foreign Application Priority Data

Jul. 30, 2004 (JP) .................................... 2004-224178

(51) Int. Cl.⁷ .............................. G02B 5/22; G02B 7/00
(52) U.S. Cl. ...................... 359/892; 359/891; 348/743; 356/418; 353/84; 362/293
(58) Field of Search ................................. 359/891, 892, 359/885; 348/743; 356/418; 353/84; 363/293

(56) References Cited

U.S. PATENT DOCUMENTS

| | | | |
|---|---|---|---|
| 4,800,474 A | 1/1989 | Bornhorst | |
| 5,257,332 A | 10/1993 | Pimpinella | |
| 5,868,482 A | 2/1999 | Edlinger et al. | |
| 6,011,662 A | 1/2000 | Evans | |
| 6,024,453 A | 2/2000 | Edlinger et al. | |
| 6,574,046 B1 | 6/2003 | Shioya | |
| 6,642,969 B2 | 11/2003 | Tew | |
| 6,702,446 B2 * | 3/2004 | De Vaan et al. | 353/84 |
| 6,715,887 B2 * | 4/2004 | Chang | 353/84 |
| 6,813,087 B2 * | 11/2004 | Davis | 359/634 |
| 2002/0105729 A1 * | 8/2002 | Richards et al. | 359/634 |
| 2003/0142241 A1 | 7/2003 | Allen et al. | |
| 2004/0095767 A1 | 3/2004 | Ohmae et al. | |
| 2005/0018145 A1 * | 1/2005 | Kwon et al. | 353/84 |

FOREIGN PATENT DOCUMENTS

| | | |
|---|---|---|
| JP | A-03-122903 | 5/1991 |
| JP | A-05-090391 | 4/1993 |
| JP | A-06-347639 | 12/1994 |
| JP | A 10-48542 | 2/1998 |
| JP | A-10-048542 | 2/1998 |
| JP | A-11-115711 | 4/1999 |
| JP | A-11-222664 | 8/1999 |
| JP | A-2001-073136 | 3/2001 |
| JP | A-2003-57424 | 2/2003 |
| JP | A-2003-050309 | 2/2003 |
| JP | A 2004-101827 | 4/2004 |
| JP | A-2004-101827 | 4/2004 |
| WO | WO 94/25796 | 11/1994 |

* cited by examiner

Primary Examiner—Leonidas Boutsikaris
(74) Attorney, Agent, or Firm—Oliff & Berridge, PLC

(57) ABSTRACT

In a color wheel comprising plurality of color filter segments, one of the filter segments consists of a sector portion, and a circular core portion which is formed integrally at the inner circumferential area of the sector portion, and which is located at the center of the wheel assembled. The inner circumferences of the remaining filter segments are fitted directly to the outer perimeter of the circular core portion of the one segment, whereby the geometric accuracy of the color wheel can be achieved. Also, the alignment process of the filter segments for preventing the color wheel from generating vibrations and noises at the time of spinning at high speed can be simplified or even eliminated thus preventing the number of manufacturing processes from increasing.

8 Claims, 5 Drawing Sheets

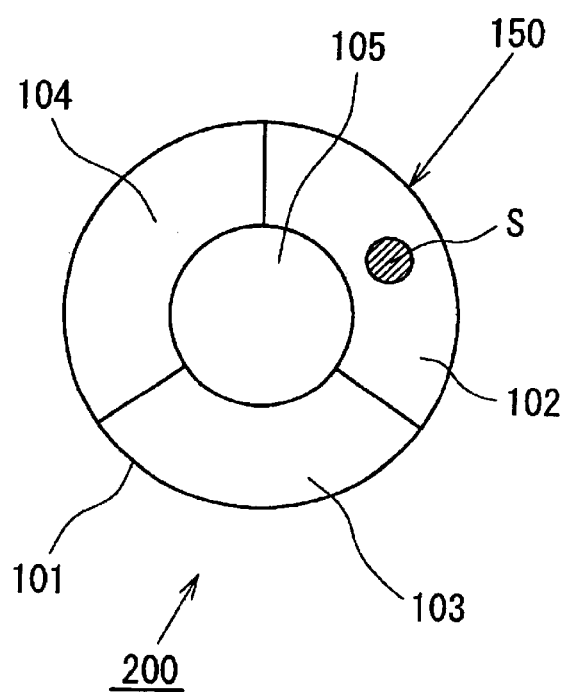
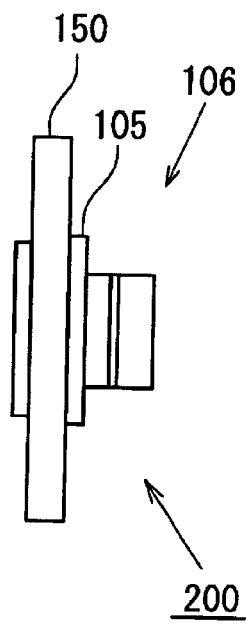
Fig. 5A
Fig. 5B

COLOR WHEEL OF SEGMENT TYPE

BACKGROUND OF THE INVENTION

1. Field of the Invention

The present invention relates to a color wheel suitable for use as a filter element of a time-share light dispersing device, and more specifically to a color wheel of segment type.

2. Description of the Related Art

Color composition in a projection-type image display apparatus has conventionally been accomplished commonly by a method, such as: a single-panel method, in which one light valve element adapted to control light amount per pixel thereby creating an image is used to disperse each pixel into R (red), G (green), and B (blue) lights; and a three-panel method, in which three light valve elements dedicated to R, G and B lights, respectively, are used to produce R, G and B images in parallel, and then the three images thus produced are composed. Recently, as a light valve element capable of fast switching, such as a ferroelectric liquid crystal display element or a digital micro-mirror device, is increasingly coming into practical use, a time-sharing single-panel method is widely used. In the time-sharing single-panel method, R, G and B lights are caused to sequentially impinge on one light valve element, the light valve element is driven in synchronization with switching-over of the R, G and B lights thereby producing R, G and B images in a time-series manner, and the images thus produced are projected onto a screen, or the like. Here, color composition of the images is accomplished by a viewer due to an afterimage effect occurring at a sense of vision. In the time-sharing single-panel method, reduction in both dimension and weight of the apparatus, which is a feature of a single-panel method, can be achieved by employing a relatively simple optical system, and therefore the time-sharing single-panel method is favorable for realizing inexpensive fabrication of a projection-type image display apparatus. In such an image display apparatus, a color wheel is preferably used as a filter element of a time-share light dispersing device to sequentially disperse light emitted from a white light source into R, G and B lights having respective wavelength bands in a time-sharing manner.

FIGS. 5A and 5B are respectively top plan and side views of a conventional and typical color wheel assembly 200 as a time-share light dispersing device including such a color wheel. Referring to FIG. 5B, the color wheel assembly 200 comprises a color wheel 150, and a driving motor 106 including a motor hub 105. The color wheel 150 is a tricolor color wheel and is composed of a disk-like substrate 101 made of a light-transmitting material, for example, optical glass, and three pie-shaped (sectorial) filters 102, 103 and 104 adapted to transmit exclusively, for example, R, G and B lights, respectively are formed on a surface of the substrate 10. The color wheel 150 thus structured is fixedly attached to the motor hub 105 coaxially therewith. The color wheel assembly 200 operates such that the color wheel 150 is spun by the driving motor 106 so that white light S impinges sequentially on the filters (R, G and B) 102, 103 and 104 whereby the white light S is sequentially dispersed into R. G and B lights.

There are two types of color wheel structures: a monolithic type structured such that respective color filters are formed on a disk-like substrate, such as the color wheel 150 described above; and a segment type structured such that respective color filter segments separately prepared in a sectorial shape are fixedly attached to one another so as to form a disk.

FIGS. 6 and 7 show respectively top plan and exploded side sectional view of a segment-type color wheel 160 comprising a plurality (four in FIG. 6) of sectorial color filter segments (hereinafter referred to simply as segments as appropriate) 112, 114, 116 and 118 which are separately prepared and are fixed in position by means of a support member 120 and a clamp member 122 so as to form a disk.

Specifically, as shown in FIG. 7, respective inner circumferences 112a, 114a, 116a and 118a of the segments 112, 114, 116 and 118 are fitted to an outer circumference of a smaller cylinder portion 120a of the support member 120 whereby the segments 112, 114, 116 and 118 are duly set in position in the radial direction of the color wheel 160, and respective surfaces of the segments 112, 114, 116 and 118 toward the inner circumferences 112a, 114a, 116a and 118a are fitted to an annular seat portion 120b of the support member 120 whereby the segments 112, 114, 116 and 118 are duly set in position in the thickness direction of the color wheel 160. Then, a smaller cylinder portion 122a of the clamp member 122 is engagingly inserted into a hollow 120c of the support member 120 so that an annular seat portion 122b of the clamp member 122 and the aforementioned annular seat portion 120b of the support member 120 sandwich and clamp the inner circumferential portions of the 112, 114, 116 and 118. And, when the support member 120 and the clamp member 122 are bonded or screwed together, the segments 112, 114, 116 and 118 are fixed in position. The color wheel 160 thus structured is fixedly attached to a hub (such as the hub 105 shown in FIGS. 5A and 5B) of a motor (such as the driving motor 106 shown FIG. 5B) such that the hub is inserted in a hollow 122c of the clamp member 122 (refer to, for example, Japanese Patent Applications Laid-Open Nos. 2004-101827 ([0010], and FIG. 6 therein) and H10-48542 (Claim 1, and FIG. 2 therein).

A monolithic-type color wheel structured with a single substrate makes it easy to maintain the geometric accuracy and therefore easy to hold down the generation of vibrations and noises at the time of spinning, but requires sophisticated processes of forming color filters on the substrate thus resulting in cost disadvantage. A segment-type color wheel has an advantage over the monolithic type in this respect, but requires a high degree of accuracy in positioning separately prepared segments and therefore must ultimately go through an alignment process for preventing the generation of vibrations and noises at the time of high speed spinning thus increasing the number of manufacturing processes. Also, in the segment-type color wheel, a support member is additionally required in order to accurately position color filter segments separately prepared, which not only results in an increased number of components, but also requires a very high dimensional precision on both the segments and the support member because the both components are prepared independently at different processes using respective equipments totally different from each other, and fitted together at a later step.

SUMMARY OF THE INVENTION

The present invention has been made in light of the circumstances described above, and it is an object of the present invention to inexpensively provide a high-precision color wheel of segment type.

In order to achieve the object described above, according to one aspect of the present invention, a color wheel comprises a plurality of sectorial color filter segments disposed so as to form a disk, and at least one of the color filter segments has a core portion to which the inner circumferences of remaining color filter segments are directly fitted. The color wheel thus structured does not necessarily require a support member to which the color filter segments are fitted so as to be duly positioned in the color wheel assembled. Also, since the color wheel is composed of the color filter segments alone therefore requiring only machines to process the color filter segments, machine accuracy can be managed easily compared to when additional components, such as a support member, which must be precisely fitted together with the color filter segments, are employed thus requiring additional machines.

In the one aspect of the present invention, the at least one color filter segment having the core portion may be configured so as to ensure positional accuracy of the color filter segments with respect to one another in radial and circumferential direction of the color wheel. Consequently, the color wheel is surely configured with a required precision spontaneously when the color filter segments are duly put together.

In the one aspect of the present invention, the core portion of the at least one color segment may constitute a central portion of the color wheel, and may have a hole concentric with the center axis of the color wheel. Consequently, the color wheel can be easily aligned and fixed to a motor.

In the one aspect of the present invention, the core portion of the at least one color filter segment may define an outer perimeter configured complementary to the inner circumferences of the remaining color filter segments. With this structure, the advantages described above can be better achieved. Further, if the configuration is arranged so as to increase the fitting area between the outer perimeter of the core portion of the at least one color filter segment and the inner circumferences of the remaining color filter segments so that sufficient bonding strength is attained therebetween, then the support member can be definitely eliminated, and the segment-type color wheel can be handled like a monolithic-type color wheel thus enjoying advantages available with a monolithic-type color wheel.

And, in the one aspect of the present invention, the outer perimeter of the core portion of the at least one color filter segment, and the inner circumferences of the remaining color filter segments may be configured with an undercut so that the remaining color filter segments are locked up in the radial direction. Thus, the color filter segments can be surely prevented from getting scattered off due to centrifugal force when the color wheel spins at high speed.

BRIEF DESCRIPTION OF THE DRAWINGS

FIGS. 5A and 5B are respectively plan and side views of a typical color wheel assembly incorporating a color wheel;

DETAILED DESCRIPTION OF THE PREFERRED EMBODIMENTS

Figure 1A:
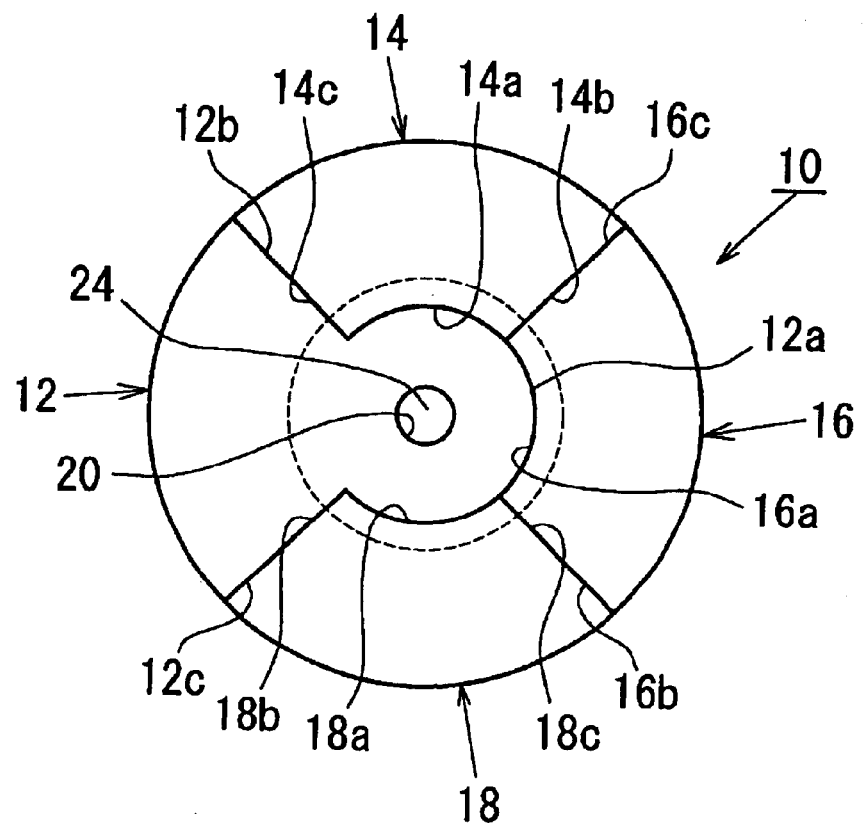
FIGS. 1A and 1B are respectively plan and sectional views of a segment-type color wheel according to a first embodiment of the present invention.

Preferred embodiments of the present invention will hereinafter be described with reference to the accompanying drawings. In the drawings of the respective embodiments, the elements corresponding to the elements of the prior art have the same reference numbers and will not be described in detail.

Referring to FIG. 1A, a color wheel 10 according to a first embodiment of the present invention comprises a plurality of sectorial color filter segments (hereinafter referred to simply as "segments" as appropriate) 12, 14, 16 and 18 which are fixedly set together so as to form a disk. The segment 12 consists of a sector portion, and a circular core portion which is integrally formed at the inner circumferential area of the sector portion, has a center hole 20, and defines an outer perimeter 12a. Respective inner circumferences 14a, 16a and 18a of the segments 14, 16 and 18, are directly fitted to the outer perimeter 12a of the circular core portion of the segment 12, and when the segments 12, 14, 16 and 18 are thus set together in place to complete the color wheel 10, the circular core portion of the segment 12 is located at the central area of the color wheel 10 such that the center hole 20 is concentric with the center axis of the color wheel 10.

The segments 14, 16 and 18 are duly positioned in the radial direction of the color wheel 10 such that their respective inner circumferences 14a, 16a and 18a are fitted to the outer perimeter 12a of the circular core portion of the segment 12, and the segments 12, 14, 16 and 18 are duly positioned in the circumferential direction such that each segment (for example, 12) has its both straight sides (for example, 12b and 12c) fitting to confronting straight sides (for example, 14c and 18b) of its adjacent segments (for example, 14 and 18). Thus, the segments 12, 14, 16 and 18 are configured so as to ensure positional accuracy in both the radial and circumferential directions of the color wheel 10 when the segments 12, 14, 16 and 18 are duly put together to complete the color wheel 10.

Figure 1B:
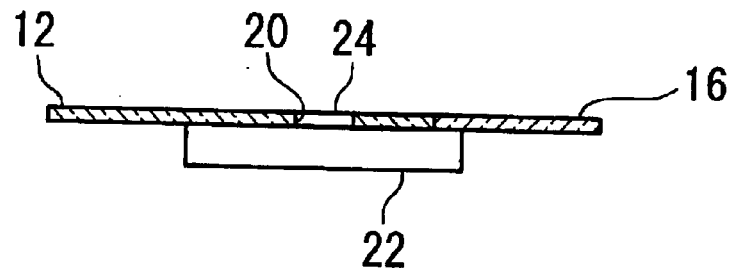

The color wheel 10 is manufactured in the following steps: respective segment pieces for the segments 12, 14, 16 and 18 are cut out of a glass substrate using a scribing apparatus; a dichroic filter is formed on each segment piece of glass by vacuum deposition technique, such as evaporation method; and the inner circumferences 14a, 16a and 18a of the segments 14, 16 and 18 are fitted to the outer perimeter 12a of the circular core portion of the segment 12, wherein a support member 22 (refer to FIG. 1B) may be additionally used so as to adhesively hold together the segments 12, 14, 16 and 18 in which case a boss 24 of the support member 22 is engagingly fitted into the center hole 20 of the circular core portion of the segment 12. In this connection, the support member 22 functions to bind together, not to position, the segments 12, 14, 16 and 18.

The segments 12, 14, 16 and 18 do not have to be prepared in the order described above, but may alternatively be prepared such that each dichroic filter is formed entirely on a glass substrate first, and then the glass substrate is cut into a plurality of pieces using a subscribing apparatus. This method equally secures the geometric accuracy of the color wheel 10.

With the above-described structure according to the present invention, when the inner circumferences 14a, 16a and 18a of the segments 14, 16 and 18 are fitted directly to the outer perimeter 12a of the circular core portion of the segment 12 in the process of assembling the color wheel 10, the segments 12, 14, 16 and 18 can be self-positioned with respect to one another very accurately thus achieving a very high accuracy on the geometry of the color wheel 10.

Consequently, a final alignment process conventionally required for preventing the generation of vibrations and noises at the time of high speed spinning of the color wheel 10 can be simplified or even eliminated.

Figure 6:
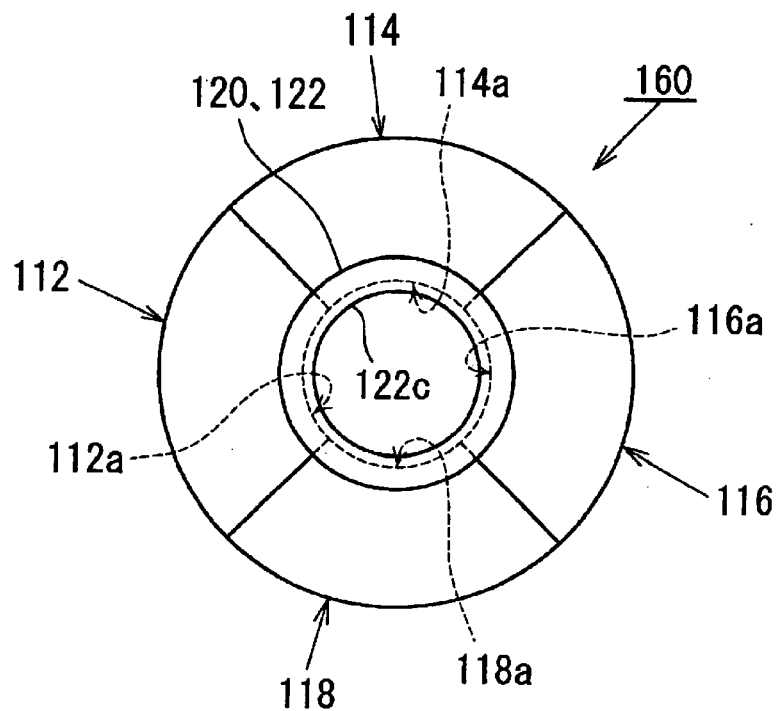
FIG. 6 is a plan view of a conventional segment-type color wheel.
Figure 7:
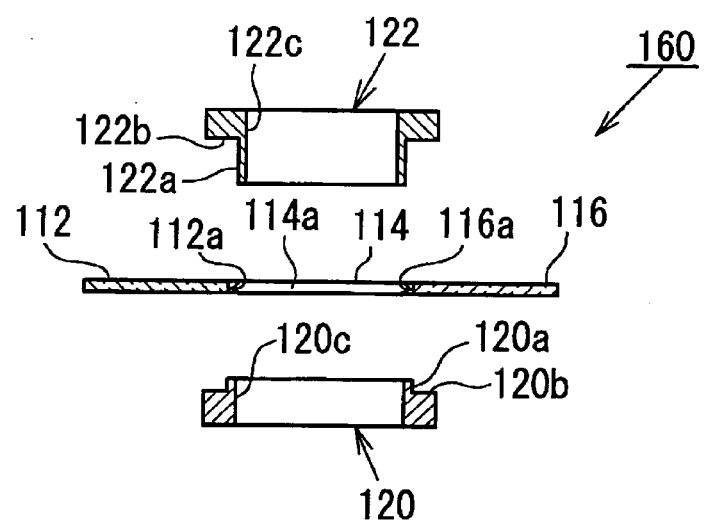
FIG. 7 is an exploded sectional view of the color wheel of FIG. 6.

Also, since the segments 12, 14, 16 and 18 can be duly positioned with respect to one another by themselves when they are put together in the process of completing the color wheel 10, a high degree of processing precision for ensuring positional accuracy is required only for the machines and apparatuses for preparing the segments 12, 14, 16 and 18, and this eases the maintenance and control work of processing precision compared to a color wheel which must use any extra component (for example, the support member 120 in FIGS. 6 and 7) that has a role to position segments.

Further, as described above, the segment 12 including the circular core portion with the outer perimeter 12a is configured so as to ensure the positional accuracy of the segments 12, 14, 16 and 18 in both the radial and circumferential directions of the color wheel 10, so the geometric accuracy of the color wheel 10 is ensured when the inner circumferences 14a, 16a and 18a of the segments 14, 16 and 18 are fitted to the outer perimeter 12a of the circular core portion of the segments 12 in the process of assembling the color wheel 10.

Still further, since the circular core portion of the segment 12 is positioned at the center of the color wheel 10 and defines the center hole 20 concentric with the center axis of the color wheel 10, the support member 22 having the cylindrical boss 24 disposed at its center can be readily self-positioned in the color wheel 10.

Figure 2:
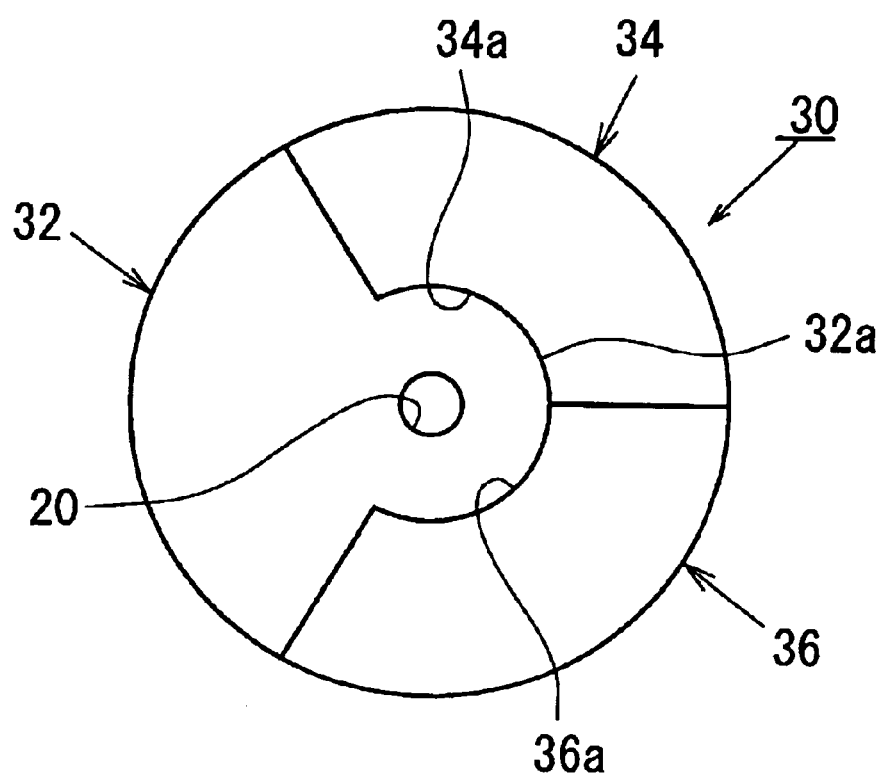
FIG. 2 is a plan view of another segment-type color wheel according to the first embodiment of the present invention.

Another segment-type color wheel according to the first embodiment will be described with reference to FIG. 2. A color wheel 30 comprises three segments 32, 34 and 36. Respective inner circumferences 34a and 36a of the segments 32 and 36 are fitted directly to an outer perimeter 32a of a circular core portion of the segment 32. Thus, the embodiment is subject to no limitations on the number of segments. Also, the embodiment can be applied to a color wheel comprising segments which have areas different from one another, and which have any optional wavelength bands including a white light range (total transmittance). The advantages common to the example shown in FIGS. 1A and 1B will be omitted here.

Figure 3:
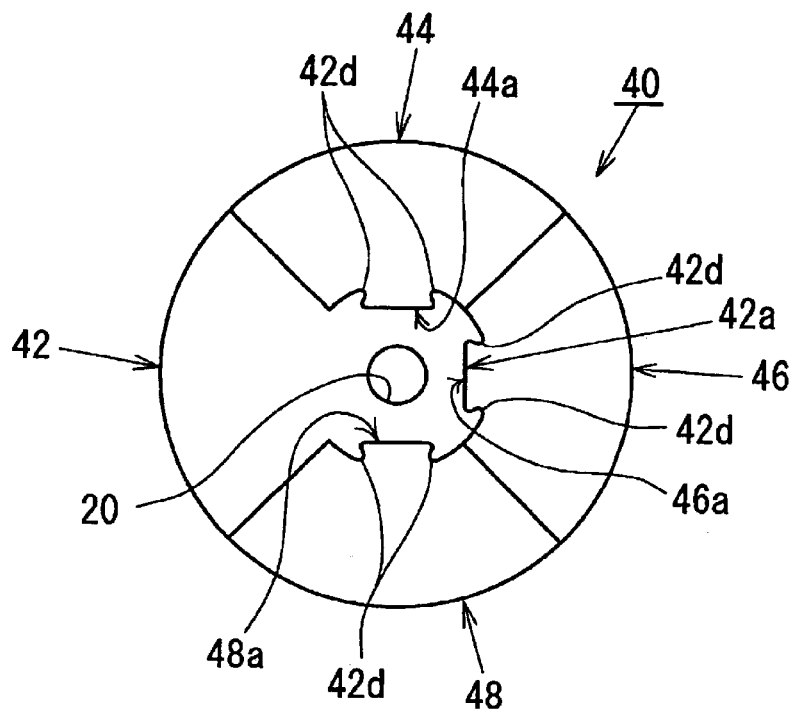
FIG. 3 is a plan view of a segment-type color wheel according to a second embodiment of the present invention.

Referring now to FIG. 3, a color wheel 40 according to a second embodiment of the present invention comprises four (same as in FIG. 1A) segments 42, 44, 46 and 48. The segment 42 consists of a sector portion and a core portion formed integrally at the inner circumferential area of the sector portion. The core portion has a center hole 20, and defines an outer perimeter 42a to which respective inner circumferences 44a, 46a and 48a of the segments 44, 46 and 48 are directly fitted. The core portion of the segment 42 defines three recesses at the outer perimeter 42a so as to form humps 42d, and the segments 44, 46 and 48 define, at the inner circumferences 44a, 46a and 48a, respective protrusions which are configured complementary to the three recesses of the segment 42 for engaging attachment. The recesses of the segment 42, and the protrusions of the segments 44, 46 and 48 may be formed in any optional configurations complementary to each other, and alternatively protrusions may be formed at the outer perimeter 42a of the core portion of the segment 42 while recesses configured complementary to the protrusions are formed respectively at the inner circumferences 44a, 46a and 48a of the segments 44, 46 and 48. The complementary configurations formed as described above surely prevent the segments 44, 46 and 48 from getting scattered off from the segment 42 due to centrifugal force when the color wheel 40 spins at high speed.

As mentioned above, a support member (for example, the support member 22 shown in FIG. 1B) may be subsidiarily used in the present invention for additional attaching strength. In the second embodiment shown in FIG. 3, since the dimension of the abutting area between the segment 42 and the segments 44, 46 and 48 is increased, the bonding strength therebetween is increased thus enhancing reliability. And, if a sufficient bonding strength is surely achieved only by adhesively fixing together the segments 42, 44, 46 and 48 in the present invention, then the support member, which is conventionally required to duly position segments, can be definitely eliminated. Consequently, the color wheel 40 can be structured similar to a monolithic-type color wheel, specifically structured without a support member, and therefore can be attached to a driving motor in the same way as a monolithic-type color wheel. In other words, the segment-type color wheel 40 can be handled like a monolithic type, and components can be standardized, which results in reduction in an overall cost for a color wheel assembly.

Figure 4:
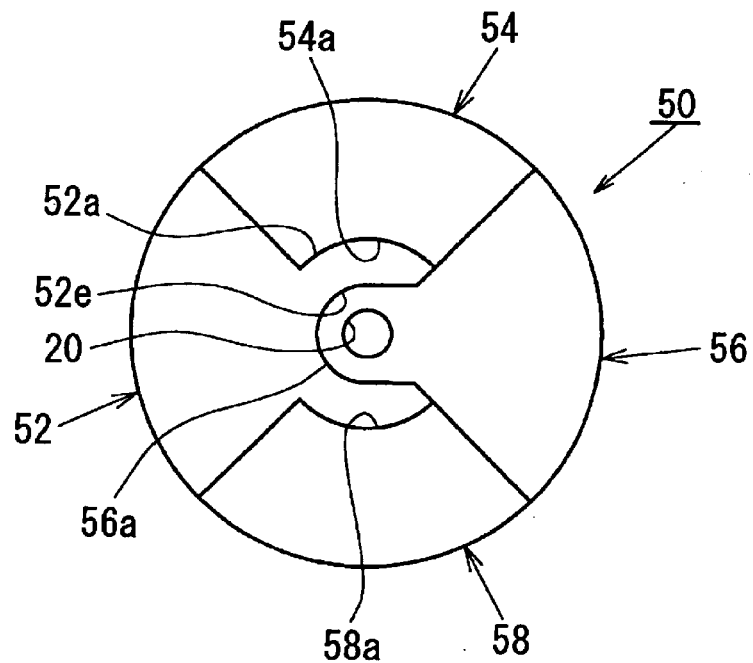
FIG. 4 is a plan view of a segment-type color wheel according to a third embodiment of the present invention.

Referring to FIG. 4, a color wheel 50 according to a third embodiment of the present invention comprises four segments 52, 54, 56 and 58. The segment 52 consists of a sector portion, and an outer core portion formed integrally at the inner circumferential area of the sector portion. The outer core portion of the segment 52 is shaped substantially into a three-quarter ring with an open mouth positioned at an area opposite to the sector portion, defines an outer perimeter 52a separated by the open mouth into two portions to which respective inner circumferences 54a and 58 of the segments 54 and 58 adjacent to the segment 52 are directly fitted, and defines an inner perimeter 52e shaped like a U-letter. The segment 56 consists of a sector portion and an inner core portion formed integrally at the inner circumferential area of the sector portion. The inner core portion of the segment 56 is configured complementary to an opening defined by the inner perimeter 52e of the segment 52, has an center hole 20, and defines an outer perimeter 56a which is fitted directly to the inner perimeter 52e of the segment 52. The color wheel 50 thus structured achieves the same advantages as the color wheel 10.

In the present invention, the inner circumferences of segments do not have to be configured so as to be fitted to the outer perimeter of the core portion of one segment at all areas as long as the segments are held together with a sufficient bonding strength.

Obviously, many modifications and variations of the present invention are possible in light of the above teachings. Thus, it is to be understood that, within the scope of the appended claims, the invention may be practiced otherwise than as specifically described above.

What is claimed is:

1. A color wheel comprising:

a plurality of sectorial color filter segments disposed so as to form a disk, at least one of the color filter segments having a core portion to which inner circumferences of remaining color filter segments are directly fitted.

2. A color wheel according to claim 1, wherein the at least one color filter segment having the core portion is configured so as to ensure positional accuracy of the color filter segments with respect to one another in radial and circumferential direction of the color wheel.

3. A color wheel according to claim 1, wherein the core portion of the at least one color segment constitutes a central portion of the color wheel, and has a hole concentric with a center axis of the color wheel.

4. A color wheel according to claim 1, wherein the core portion of the at least one color filter segment defines an outer perimeter configured complementary to the inner circumferences of the remaining color filter segments.

5. A color wheel according to claim 4, wherein the outer perimeter of the core portion of the at least one color filter segment, and the inner circumferences of the remaining color filter segments are configured with an undercut for the remaining color filter segments to be locked up in the radial direction.

6. A color wheel according to claim 2, wherein the core portion of the at least one color segment constitutes a central portion of the color wheel, and has a hole concentric with a center axis of the wheel.

7. A color wheel according to claim 2, wherein the core portion of the at least one color filter segment defines an outer perimeter configured complementary to the inner circumferences of the remaining color filter segments.

8. A color wheel according to claim 3, wherein the core portion of the at least one color filter segment defines an outer perimeter configured complementary to the inner circumferences of the remaining color filter segments.

\* \* \* \* \*